United States Patent
Nomura

[15] 3,676,827
[45] July 11, 1972

[54] CONTROL MECHANISM FOR ADJUSTABLE ELECTRICAL DEVICE INCLUDING INDICATING MEANS

[72] Inventor: Yukihiko Nomura, Tokyo, Japan
[73] Assignee: Alps Electric Co., Ltd., Tokyo, Japan
[22] Filed: Nov. 24, 1971
[21] Appl. No.: 201,751

[52] U.S. Cl. ............................................. 338/183, 338/196
[51] Int. Cl. ............................................. H01c 9/02
[58] Field of Search ............................... 338/183, 196, 176

[56] References Cited

UNITED STATES PATENTS

| | | | |
|---|---|---|---|
| 2,980,876 | 4/1961 | Larson | 338/183 |
| 3,568,113 | 3/1971 | Hopt | 338/196 X |
| 3,582,860 | 6/1971 | Milovac | 338/183 |
| 3,617,979 | 11/1971 | Purdy | 338/183 |

*Primary Examiner*—Lewis H. Myers
*Assistant Examiner*—D. A. Tone
*Attorney*—Maxwell James et al.

[57] ABSTRACT

A control means for adjusting an electrical device having an adjustable parameter is provided in a simple, inexpensive and compact design. In the disclosed embodiment, the electrical device is a variable impedance device of the type having an electrical contact linearly movable within an elongated housing. The contact is carried by a slide which in turn is controlled by a rotatable control member operatively drivingly connected to the housing frame and having a control wheel extending through an elongated slot in the housing. The control member is provided with an axially located aperture receiving one end of an indicating pointer, that pointer having a portion of reduced cross section extending through a second longitudinal slot in the housing. The pointer is retained in its operative position within the aperture of the rotatable control member by the engagement of a shoulder thereon with the inner surface of the housing wall and is movable linearly along the housing with the slider and contact.

A scale means is adapted to cooperate with the pointer to provide accurate readout of the adjusted impedance value. In a preferred embodiment, that scale means is in the form of a transparent window opening in an outer casing generally in registration with the path of the pointer along the housing.

16 Claims, 6 Drawing Figures

Patented July 11, 1972

INVENTOR
YUKIHIKO NOMURA
BY
James M. Franklin
ATTORNEY

Patented July 11, 1972

INVENTOR
YUKIHIKO NOMURA

BY
ATTORNEY

CONTROL MECHANISM FOR ADJUSTABLE ELECTRICAL DEVICE INCLUDING INDICATING MEANS

The present invention relates to an adjustable electrical device and more particularly to a control mechanism for adjusting that device including means for indicating the adjusted electrical value.

Electrical devices of the type here involved are used to control the value of circuit parameters in various applications. Perhaps the most common type of devices in this category are variable impedance elements such as resistors or inductors. Devices such as these are utilized in a variety of applications, as elements of control circuits, potentiometers and the like. One of the most important applications of variable impedance elements is in the field of measuring and testing. For example, it is often necessary to test electrical equipment under varying conditions and to measure its response to changing circuit parameters. Conversely in designing circuits for electrical equipment it is often quite useful to test the circuit using a variety of parameters to determine optimum design. In these and other applications standard low cost variable resistors and/or inductors are generally desirable to reduce the time and expense involved.

In the past, however, variable impedance devices of this type have been found unsuitable in many applications, particularly in measuring and testing applications in which precision and accurate readout is paramount. This is because standard low cost devices of this type presently on the market are generally lacking in precision. In addition typically such devices are provided with no reliable means for accurate readout.

In devising mechanisms for providing accurate adjustment and readout of electrical devices of the type here involved, a third important and related factor must be taken into account—ease of adjustment. Thus not only must the movable electrical and indicating elements be accurately positioned in precise correlation, but also adjustment to the desired value must be accomplished easily without the necessity of several overshoots to "zero in " on the proper position. Thus the manual control mechanism must not be overly sensitive in the sense that small manipulation movements will result in large changes of the electrical property in question, yet must be sensitive enough to provide for relatively rapid adjustments along the full range of values.

In the past, the attainment of all the above requirements of accurate adjustment, precise readout and ease of operation in a low cost mass produced variable impedance device has eluded the art. As a result, it is often necessary in many applications to utilize equipment which is much more sophisticated and expensive than would seem to be required.

It is a primary object of the present invention to provide a control mechanism for adjusting the electrical parameters of electrical device which includes means for providing accurate readout of the parameters so adjusted, which device has a simple inexpensive construction, adapted for large scale, low cost, mass production.

It is another object of the present invention to provide a control device of the type described including a rotatable control member for effecting linear adjustment of an electrical contact and having a linearly movable indicator means for accurately indicating the precise amount of such adjustment.

It is yet another object of the present invention to design a variable resistor with a contact movable linearly within an elongated housing, the position of that contact being controlled by a rotatable control member extending from said housing and including indicating means movable with said rotatable member along said housing for accurately indicating the adjusted resistance.

It is yet another object of the present invention to design a control device of the type described which utilizes a minimum of simple inexpensive parts, is easy to assemble, and operates in a simple, accurate fashion.

To these ends the present invention provides a control mechanism for an electrical device of the type described which includes a manually rotatable control member adapted to adjust an electrical parameter with a high degree of precision and indicating means operatively connected thereto and movable linearly along a scale to provide an accurate readout of the current value of the adjustable parameter. In the embodiment here specifically disclosed that control mechanism is used in connection with a variable resistor of the type having a contact movable longitudinally within an elongated housing to vary the effective resistance of a resistive strip operatively connected in the circuit in question. Movement is imparted to the contact via a manually controlled rotatable member extending through a longitudinal slot in the housing and adapted upon manipulation to ride on an internal frame member. An indicator means preferable in the form of a pointer is received centrally in the rotatable control member and extends through a second longitudinal slot in a second wall of the housing. A linear scale is provided along the path of the pointer and in a preferred embodiment, that scale is provided on a transparent window portion formed in an outer casing directly above the pointer.

To the accomplishment of the above and to such other objects as may hereinafter appear, the present invention relates to a control and indicating mechanism for an electrical device as defined in the appended claims and as described herein with reference to the accompanying drawings in which:

Figure 1:
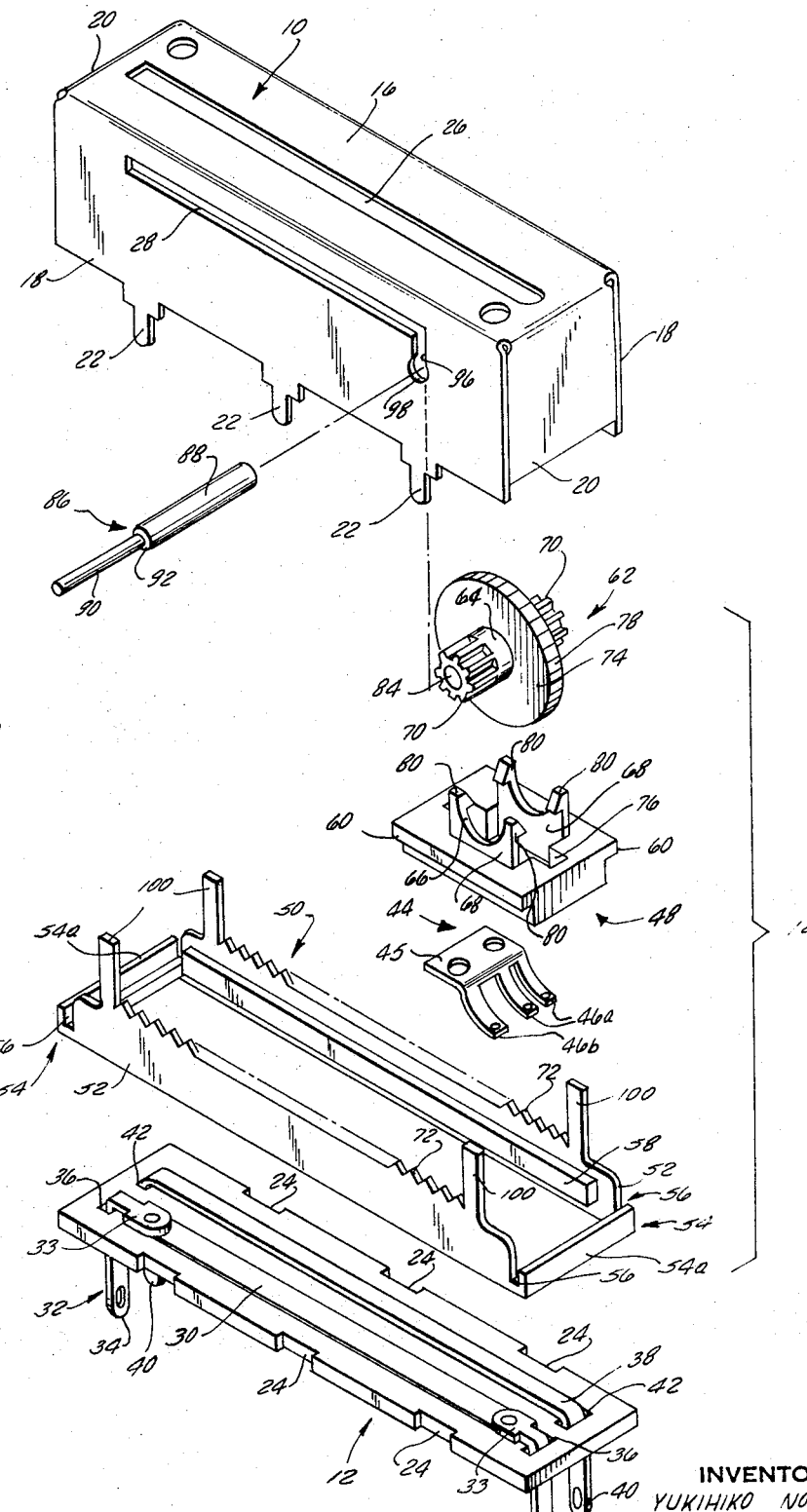
FIG. 1 is an exploded perspective view of a variable resistor constructed in accordance with the present invention.

Referring now to the drawings wherein like reference numerals designate like parts throughout the several views, and more particularly to FIG. 1, a variable resistor designed in accordance with the present invention is there shown in exploded perspective view. That variable resistor generally comprises a cover member generally designated 10 and a based generally designated 12 forming an elongated housing or enclosure within which a control mechanism generally designated 14 is disposed. Cover member 10 includes a top wall 16, elongated side walls 18 and end walls 20. Cover member 10 is adapted to be secured on base 12 to provide an elongated housing and for this purpose side walls 18 are provided with a plurality of depending tabs 22 adapted to be received in registering notches 24 formed in the elongated sides of base 12 and bent thereunder (see FIG. 4). A first elongated slot 26 is provided in the top wall 16 of cover member 10 and a second elongated slot 28 is provided in one elongated wall 18 of cover member 10. (The purpose of slots 26 and 28 will be apparent hereinafter.) As illustrated cover member 10 is preferably fabricated from a single blank of sheet metal by a suitable punching operation, side walls 18 and end walls 20 being thereafter turned downwardly as shown.

Base 12 is preferably formed of a suitable insulating material such, for example, as bakelite, and is provided with an elongated resistive element or strip 30 deposited longitudinally thereon by a suitable resistive printing process. A pair of electrical terminals 32 are secured at 33 to resistive element 30 at opposite ends thereof and extend downwardly at 34 through a pair of slots 36 in base 12 provided for that purpose. In a similar manner an elongated conductive strip 38 is disposed on base 12 parallel to and spaced from resistor 30. The opposite ends 40 of strip 38 are bent downwardly and received through a second pair of slots 42 in base 12, those ends 40 being twisted approximately ninety degrees to firmly secure the strip 38 to the base 12.

The control mechanism 14 is adapted to provide operative electrical connection between resistive strip 30 and conductive strip 38, said electrical connection being provided by an electrical contact adjustably positionable along substantially the entire length of resistor 30, thereby to vary the effective length (and thus value) of resistance connected in the operative circuit in known manner.

That contact is here illustrated as a wiper generally designated 44 and comprising a generally flat base 45 and three depending resilient contact arms 46. Contact arms 46a are adapted to wipingly engage conductive strip 38 and arm 46b is adapted to wipingly engage resistive strip 30. Wiper 44 is preferably formed of a single piece of resilient sheet metal, operative electrical connection between contact arms 46 being effected through base 45. Base 45 of wiper 44 is in turn secured to the underside of a slider generally designated 48 by any suitable means.

Figure 2:
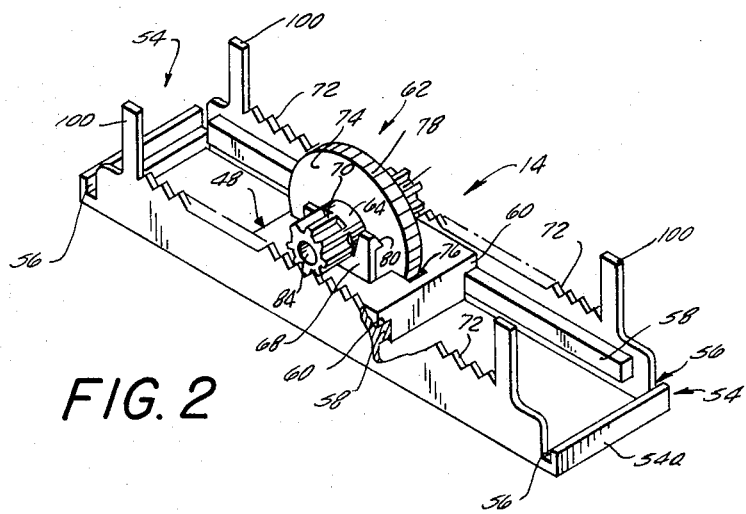
FIG. 2 is an isolated perspective view of the control mechanism for adjustment of the variable resistor of FIG. 1.
Figure 3:
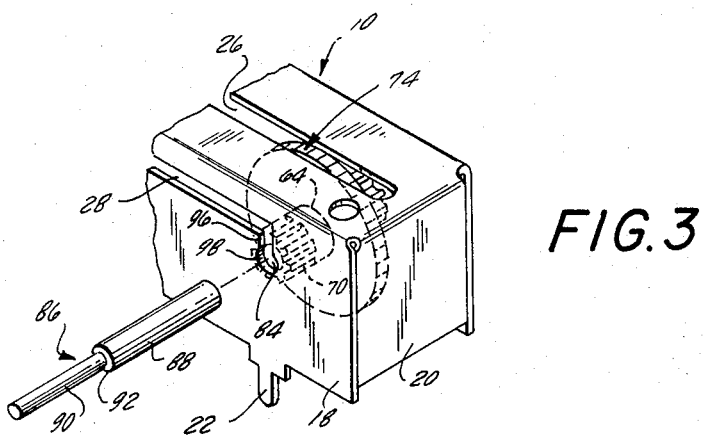
FIG. 3 is a fragmentary exploded perspective view of the cover member, control wheel and pointer of FIG. 1 showing the manner of assembly of same.

Slider 48 is preferably molded of an insulating material and is adapted to slide within the elongated housing directly above base 12. For this purpose there is provided an inner frame member generally designated 50. As best shown in FIGS. 1 and 2, frame 50 is provided with a pair of parallel side walls 52 adapted to fit within cover member 10 and a pair of transverse end pieces 54 having a generally L-shaped cross section, the vertical walls 54a of which are spaced from side walls 52 to define notches 56, those notches receiving the end walls 20 of cover member 10 (see FIG. 4).

Slider 48 is adapted to be disposed within frame 50 and to slide along a pair of opposed rails or ledges 58 formed on the opposing inner surfaces of side walls 52 of frame 50 and for this purpose slider 48 is formed with a pair of corresponding shoulders 60, rails 58 supportingly slidingly engaging shoulders 60.

As best illustrated in FIGS. 1 and 2, slider 48 is pressed into engagement with inner frame 50 and moved therealong by means of a control member generally designated 62. That control member comprises a drive shaft adapted to be cradled in generally semicircular recesses 66 formed in a pair of upstanding support members 68 extending from the upper surface of slide 48. Drive shaft 64 is formed with gear surfaces 70 at its opposite ends extending outwardly of support members 68, those gear surfaces being adapted to meshingly engage with racks 72 formed on the upper surface of side walls 52. As a result, rotation of drive shaft 64 is effective to move that drive shaft, and the slide 48 upon which it is mounted, longitudinally along frame 50 within the housing enclosure. Rotation of drive shaft 64 is effected through a disc like annular control wheel 74 which, as best shown in FIG. 2, is mounted concentrically fast on shaft 64 and extends radially downwardly through a slot 76 in slider 48 provided for that purpose. Control wheel 74 is preferably knurled at its outer periphery at 78 and extends radially upwardly through slot 26 on the upper wall of cover member 10.

Figure 4:
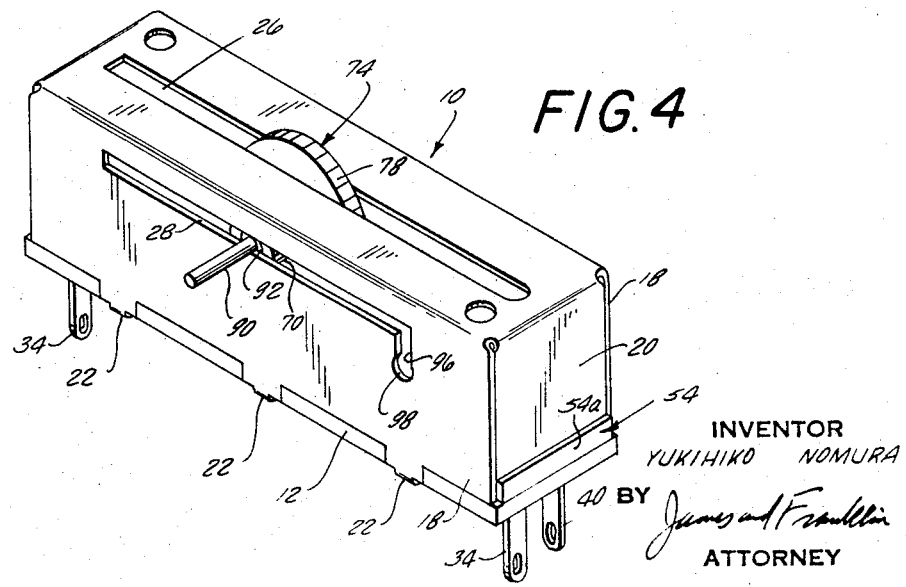
FIG. 4 is a perspective view of the assembled variable resistor of FIG. 1.

Accordingly, as best illustrated in FIG. 4 the control wheel 74 is easily manipulated from the outside of the housing by the operator's finger in a familiar manner.

Figure 6:
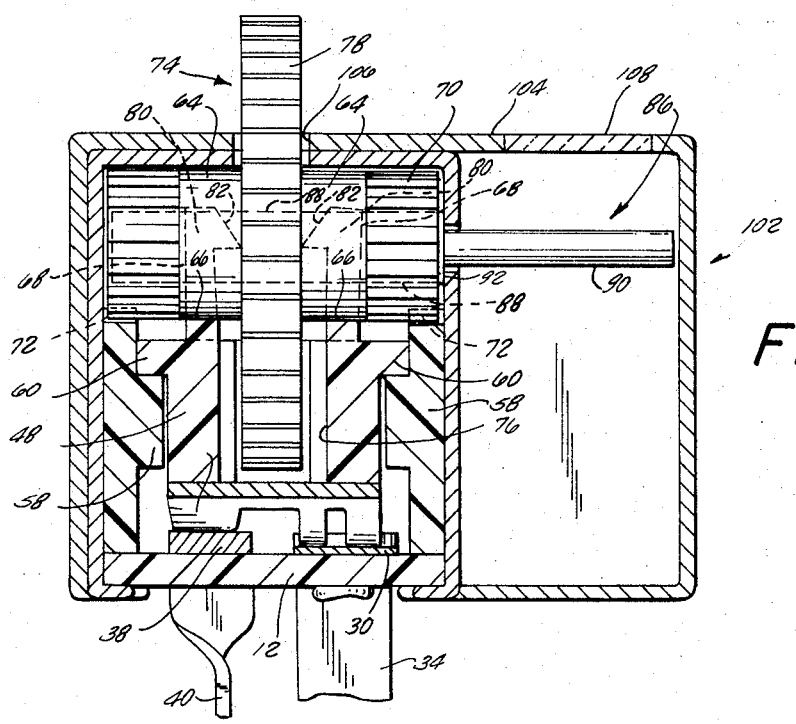
FIG. 6 is a cross sectional view taken generally along the line 6—6 of FIG. 5.

As best shown in broken lines in Fig. 6, support members 68 are somewhat resilient and are provided with opposing gripping fingers 80 snugly engaging opposite sides of wheel 74 thereby to aid in retaining shaft 64 within the cradle formed by recesses 66. To facilitate assembly those gripping fingers are formed with inwardly and downwardly inclined surfaces 82, whereby wheel 74 is easily inserted downwardly therebetween and retained in the position shown by slight pressure of the fingers 80.

Referring again to Fig. 1, it will be seen that drive shaft 64 is formed with an axially extending central aperture 84. An indicating member in the form of a pointer 86 is formed with a first portion 88 having an enlarged cross section and adapted to be received within aperture 84 in shaft 64 and a second portion 90 adapted to extend outwardly from shaft 64 and laterally through slot 28 in cover 10, an annular shoulder 92 being defined between portions 88 and 90. As best shown in Fig. 6, the diameter of the large portion 88 of pointer 86 is somewhat greater than the width of slot 28 and thus that portion is retained within aperture 84 by the engagement of the shoulder 92 with the inner surface of cover 10. To facilitate assembly horizontal slot 28 communicates at one end with the upper end of a vertical slot 96 having a corresponding width, that vertical slot communicating with an enlarged generally circular aperture 98 at its lower extremity. As indicated in Fig. 1, aperture 98 is large enough to receive the large portion 88 of pointer 86.

The method of assembly of the variable resistor of Fig. 1 will now be apparent. First the control member 62 is inserted through the open bottom end of the cover member and the aperture 84 in shaft 64 is brought into registration with the aperture 98 in the side wall 18 of the cover member. The enlarged end of pointer 88 is then inserted through aperture 98 and received within the aperture 84 in the shaft 64. The control member 62 and pointer 86 are then moved upwardly (pointer portion 90 traversing the vertical slot 96) until the pointer is level with the horizontal pointer slot 26. The enlarged pointer portion 88 is now retained within the shaft 64 by the wide walls 18 of the cover member. The slider member 48 is then fitted onto the control member 62 in a manner already described, wheel 74 being inserted between gripping fingers 80 into slot 76, recesses 66 engaging shaft 64 in cradling relationship (see Fig. 2). Inner frame 50 is then fitted onto the cover member 10, end walls 20 being received in notches 56 and rack 72 engaging gear surfaces 70 on shaft 64 (see Fig. 2). Finally, the cover member 10 is positioned on the base 12 and secured thereto by folding tabs 22 thereunder as shown in Fig. 4. When so assembled, the resilient contact arms 46 are pressed into wiping engagement with strips 30 and 38 on base 12. Those contacts may then be moved along the strips 30 and 38 by rotating control wheel 74. The sensitivity of control wheel 74 is dependent on the relative diameters of shaft 64 and wheel 74. Thus it will be appreciated that a complete rotation of wheel 74 will effect a linear movement of shaft 64 and slide 48 equal to the pitch circumference of gear surfaces 70.

As best shown in Fig. 2, to assure that gear surfaces 70 remain in meshing engagement with racks 72, the side walls 52 of frame 50 are each provided with a pair of upstanding fingers 100 at either end of rack 72, those fingers serving as stop members effective to engage shaft 64 at either end of its travel.

Figure 5:
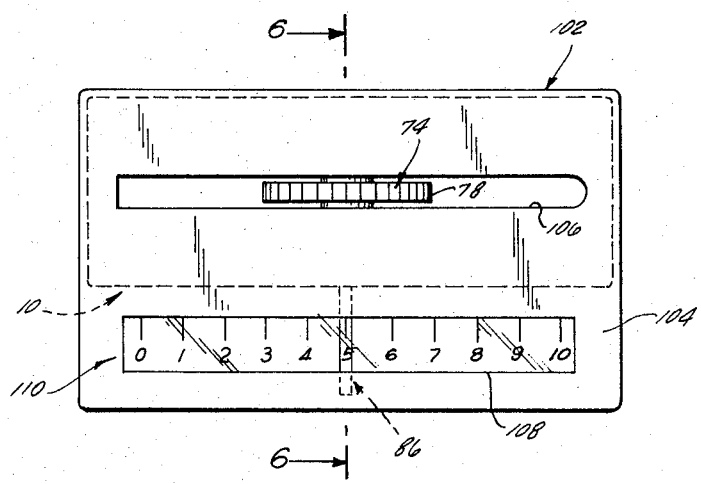
FIG. 5 is a top plan view of the variable resistor of FIG. 1 enclosed in an outer casing having a window scale cooperating with the pointer.

As best shown in Fig. 4, in the assembled device the pointer 86 extends laterally outwardly from the housing enclosure and serves to accurately indicate the position of the shaft 64 and thus the slide 48 and wiper 44. That position may be accurately correlated with the resulting resistance value connected in the circuit by means of a properly calibrated scale provided adjacent the pointer along its path of travel. While various arrangements designed for this purpose are possible a preferred arrangement is illustrated in the embodiment of Figs. 5 and 6.

As there illustrated, the entire device is enclosed in an outer casing 102 having a width great enough to accommodate the free end 90 of pointer 86. The top wall 104 of casing 102 is provided with a longitudinal slot 106 in registration with slot 26 in cover member 10, control wheel 74 extending radially upwardly through that slot. Wall 104 is additionally provided with an elongated transparent window area 108 generally parallel to slot 106 and in generally vertical registration with the free end 90 of pointer 86. Window area 108 may be formed of any transparent material such, for example, as glass and is provided with indicia 110 defining a properly calibrated scale. For example, in the case of a variable resistor indicia 110 would be calibrated in terms of resistance value (i.e., ohms). In accordance with this construction, the effective value of resistance is easily determined by viewing the position of the visible portion of pointer 86 along the scale 110.

In the embodiment illustrated, the scale is conveniently located directly adjacent the control wheel 74, whereby adjustment and readout may be accomplished with a minimum of expended time and effort. While the use of a separate outer casing 102 as illustrated in FIGS. 5 and 6 provides a neat, compact device which is easy to handle and use and affords protection for the pointer 86, it will be apparent that an outer casing is not absolutely necessary to the effective operation of the device. Thus for example the scale 110 might be printed directly on the side wall 18 of the cover member 10 below the slot 28 and the pointer might be bent downwardly to overlie that scale. Many additional arrangements will be apparent to those skilled in the art.

It will be appreciated from the foregoing that there is provided herein a particularly effective control and indicating mechanism for an electrical device having an adjustable parameter. The device is constructed of a few rather simple inexpensive parts and is particularly adapted for rapid and easy assembly. The device described herein is easily and accurately adjustable and may be conveniently calibrated for precise readout of the adjusted value of the electrical property in question. While the device has been here specifically disclosed in connection with a variable resistor, it will be apparent that it is susceptible to use in connection with a variety of other electrical devices having an adjustable parameter.

While only a single embodiment of the present invention is herein specifically described, it will be appreciated that many variations may be made therein all with the scope of the present invention as defined in the following claims.

I claim:

1. In a control means for adjusting the value of an electrical device comprising an elongated frame, slide means slidably mounted on said frame, and a rotatable control member operatively connected to said slide means and movable therewith, said control member being manually rotatably adjustable, and when so adjusted being effective to move said slide means longitudinally along said frame, the improvement comprising scale means on said frame and indicating means mounted axially on said control member and extending laterally therefrom for movement therewith, whereby the movement of said indicating means along said scale means provides an indication of the change of value of said electrical means.

2. The control means of claim 1, further comprising rotatable drive means operatively drivingly connecting said control member to said frame and effective to move said control member longitudinally along said frame in response to rotation of said control member.

3. The control means of claim 2, further comprising rack means on said frame and wherein said drive means comprises gear means fast with said control member and operatively engaging said rack means on said frame.

4. The control means of claim 3, wherein said frame includes a housing, an elongated slot in one wall of said housing, said control member comprising a rotatable control knob radially projecting outwardly of said housing through said slot.

5. The control means of claim 4, further comprising a second longitudinal slot in another wall of said housing, said indicating means comprising a pointer extending through said second slot.

6. The control means of claim 5, wherein said control member is provided with an axially disposed receptacle loosely receiving one end of said pointer and means retaining said one end of said pointer within said receptacle.

7. The control means of claim 6, wherein said other end of said pointer extends through said second slot outwardly of said housing wall, said retainer means comprising a portion on said pointer interior of said housing wall of wider cross section, said wider portion abutting said housing wall.

8. The control means of claim 7, wherein said housing wall is provided with an aperture communicating with said second slot, offset laterally therefrom, and adapted to receive said portion of wider cross section on said pointer, whereby said one end of said pointer may be inserted into said housing through said aperture and said pointer moved to a position extending through said slot.

9. The control means of claim 1, wherein said indicating means comprises a pointer, said control member having an axially disposed receptacle loosely receiving one end of said pointer and means retaining said one end of said pointer within said receptacle.

10. The control means of claim 9, wherein said frame includes a housing, an elongated slot in one wall of said housing, said control member comprising a rotatable control member radially projecting outwardly of said housing through said slot.

11. The control means of claim 10, further comprising an elongated pointer slot in another wall of said housing, said other end of said pointer extending through said pointer slot outwardly of said housing wall, said retainer means comprising a portion on said pointer interior of said housing wall of wider cross section, said wider portion abutting said housing wall.

12. The control means of claim 11, wherein said housing wall is provided with an aperture communicating with said slot offset laterally therefrom and adapted to receive said portion of wider cross section on said pointer, whereby said one end of said pointer may be inserted into said housing through said aperture, and moved adjacent said slot.

13. The control means of claim 1, wherein said frame includes an outer casing, said scale means comprising a transparent elongated window portion on said outer casing in registration with said indicating means.

14. The control means of claim 13, further comprising rotatable drive means operatively drivingly connecting said control member to said frame and effective to move said control member longitudinally along said frame in response to rotation of said control member.

15. The control means of claim 14, further comprising rack means on said frame and wherein said drive means comprises gear means fast with said control member and operatively engaging said rack means on said frame.

16. The control means of claim 13, wherein said indicating means comprises a pointer, said control member having an axially disposed receptacle loosely receiving one end of said pointer and means retaining said one end of said pointer within said receptacle.

* * * * *